United States Patent [19]

Ketchpel

[11] 4,040,727
[45] Aug. 9, 1977

[54] TRANSFLECTOR

[75] Inventor: Richard D. Ketchpel, Santa Barbara, Calif.

[73] Assignee: Rockwell International Corporation, El Segundo, Calif.

[21] Appl. No.: 612,121

[22] Filed: Sept. 10, 1975

[51] Int. Cl.² ............................................. G02B 5/08
[52] U.S. Cl. ................................. 350/288; 350/320
[58] Field of Search ............... 350/288, 291, 172, 173, 350/174

[56] References Cited

U.S. PATENT DOCUMENTS

| | | | |
|---|---|---|---|
| 1,199,882 | 10/1916 | Frey | 350/291 |
| 1,231,710 | 7/1917 | Comstock | 350/173 X |
| 1,451,774 | 4/1923 | Holbrook et al. | 350/288 UX |
| 2,387,745 | 10/1945 | Colbert et al. | 350/288 |
| 3,450,465 | 6/1969 | Prance et al. | 350/291 X |

Primary Examiner—F. L. Evans
Attorney, Agent, or Firm—H. Frederick Hamann; G. Donald Weber, Jr.

[57] ABSTRACT

There is provided an efficient semi-transparent reflector (transflector) which reflects direct light under normal, ambient light conditions but permits back lighting of a display, such as an LCD display, under dark ambient light conditions. Such a "transflector" is inexpensive to manufacture and provides an efficient device in which the pattern and body color of the reflector can easily be changed.

9 Claims, 7 Drawing Figures

TRANSFLECTOR

BACKGROUND OF THE INVENTION

1. Field of the Invention

The invention relates to semi-transparent, reflective devices which are very efficient.

2. Prior Art

Previous transflectors, such as those used in LCD calculators, have used a semi-transparent, semi-reflective metal film. Typically, the metal is applied to a surface of a glass substrate by spraying or silk-screening techniques and then thermally treated to produce a smooth reflecting film. Thin evaporated metal films have also been used in a similar manner. The evaporated films can be applied to plastics, as well as glass, without a requirement for heat treating to obtain a shiny surface.

However, the low transmission efficiency of these devices is a severe limitation of this technique for use in a watch reflector. In an electric watch, battery life is at a premium. Efficient light transmission from the light source behind the display, through the reflector, to the observer's eyes in dark ambient light situations is important for long battery life. In addition, good reflection is important for viewing the display under high light ambient conditions. The low transmission efficiency of the semi-transparent metal film is directly related to light absorption in the metal film.

Another prior art technique for providing transflectors is the use of a multilayer dielectric mirror. In this case, efficient transmission can be provided at one wavelength (e.g. red) while efficient reflection is provided at another wavelength (e.g. green). Completely efficient operation is, generally, not obtainable. Experimentally, it has been found that about nine (or more) vacuum deposited layers are required to produce a satisfactory transflector for watch use, thereby resulting in an expensive manufacturing process. A smooth substrate must be used to maintain equal dielectric thickness across the reflector surface. Also, the color is dependent on the thickness of the layers deposited. Moreover, the color and hue can be controlled only over a relatively narrow range.

SUMMARY OF THE INVENTION

The transflector of this invention consists of a discontinuous reflecting film which is vacuum deposited on a surface of a light transmitting material. The mesh or pattern of the reflecting islands is chosen to be fine enough so that the naked eye cannot resolve the mesh pattern. Through use of "multiplexed space" on the reflector, the clear areas transmit light with high efficiency and the reflecting areas reflect with high efficiency. The transmitting material may have either a smooth or a textured surface upon which the reflecting film is deposited.

BRIEF DESCRIPTION OF THE PREFERRED EMBODIMENTS

Figure 1:
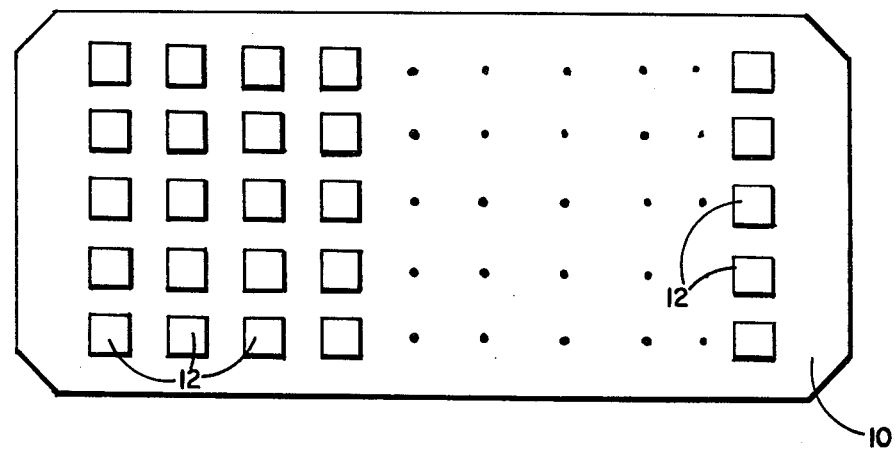
FIG. 1 is a plan view of a transflector in accordance with the instant invention.

In the following description and in the accompanying drawings, similar components bear similar reference numerals.

Referring now to FIG. 1, there is shown a transflector which comprises a substrate 10 and a plurality of reflecting islands 12 deposited on the substrate. Typically, but not limitatively, the islands may be fabricated of metal, silicon, oxide or any suitable reflective material. For convenience islands 12 are shown spaced relatively far apart. However, in actuality, the islands are sufficiently closely spaced such that, to the naked eye, there appears to be a continuous film.

Figure 2:
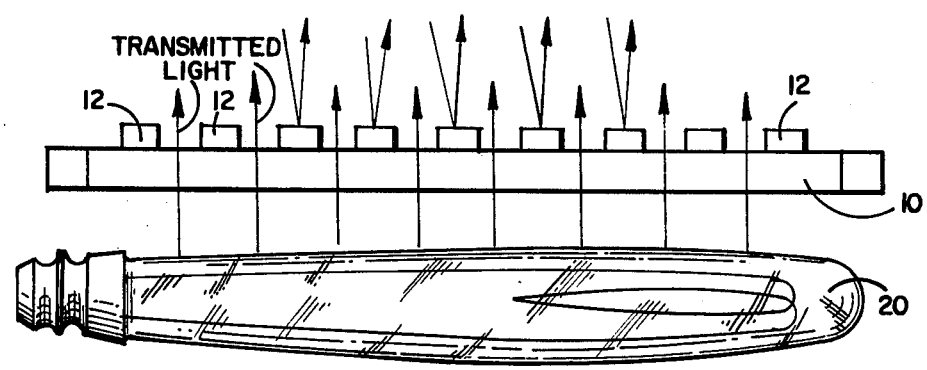
FIG. 2 is a side or elevational view of one embodiment of the transflector shown in FIG. 1.

Referring to FIG. 2, there is shown a side view of the one embodiment of the transflector shown in FIG. 1. In this embodiment, the transflector comprises a sheet 10 of light transmitting material such as a plastic or vinyl which has smooth surfaces. Typically, the material of sheet 10 is transparent, although translucent material can be utilized. The reflecting film or islands 12 are deposited on the smooth surface as described relative to FIG. 1.

Figure 3:
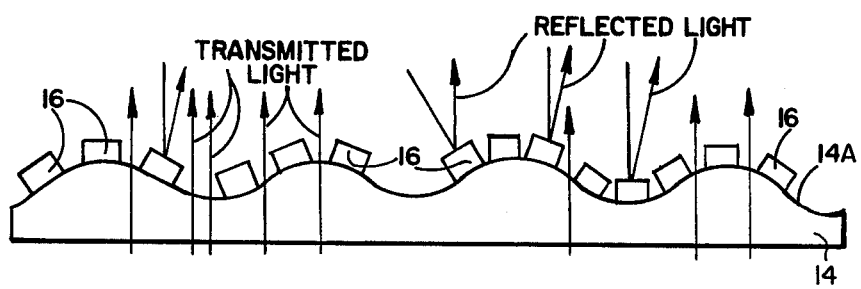
FIG. 3 is a side or elevational view of another embodiment of the transflector shown in FIG. 1.

Referring to FIG. 3, there is shown a side view of another embodiment of the transflector constructed in accordance with FIG. 1. In the embodiment shown in FIG. 3, substrate 14 (equivalent to substrate 10) is a calendared vinyl sheet whereby a directional transflector is obtained. Consequently, the surface 14A appears, microscopically, to have an undulating or wavy surface. The metal islands 16 are deposited on this wavy surface 14A in the same manner as the islands are formed on substrate 10 in FIGS. 1 and 2. Typically, the islands 16, which are produced on the wavy surface 14A of the substrate 14, have a fissured appearance after having been plated as described infra.

Referring now to FIGS. 2 and 3, the discontinuous film layer functions as a reflecting surface to incident light from above the transflector. This incident light may be considered to be typical ambient light such as sunlight, room light, or the like. The incident light is reflected back to the source or towards the observer. Because of the substantial coverage of the surface of substrate 10 by islands 12, most of the incident light is reflected. Only a small portion of the incident light will pass through the inter-island spaces toward the back of substrate 10 and be lost. This reflected light, in a generally light ambient condition, is of sufficient quantity and quality to permit a display located generally above the transflector to be back lighted thereby.

Conversely, in a relatively dark ambient condition, i.e. in a darkened room or the like, auxiliary light is frequently required. In these instances, a back light source 50 (illustrated as but not limited to an incandescent bulb) is activated by a suitable source (not shown). Activation of the back light source causes light to pass through light-transmitting substrate 10 and through the inter-island spaces to back light a display located above the transflector. Inasmuch as less light of an auxiliary nature is generally required, the transmission through the transflector of light of sufficient quantity is permitted due to the inter-island spaces on the surface of the substrate. Typically, a 16% transmitting pattern is optimum for this type of transflector in a watch display application. Other relative ratios can be determined for other applications. Thus, it is seen that the transflector which provides efficient reflection as well as efficient transmission of light is provided by devices shown in FIGS. 1-3.

Figure 4:
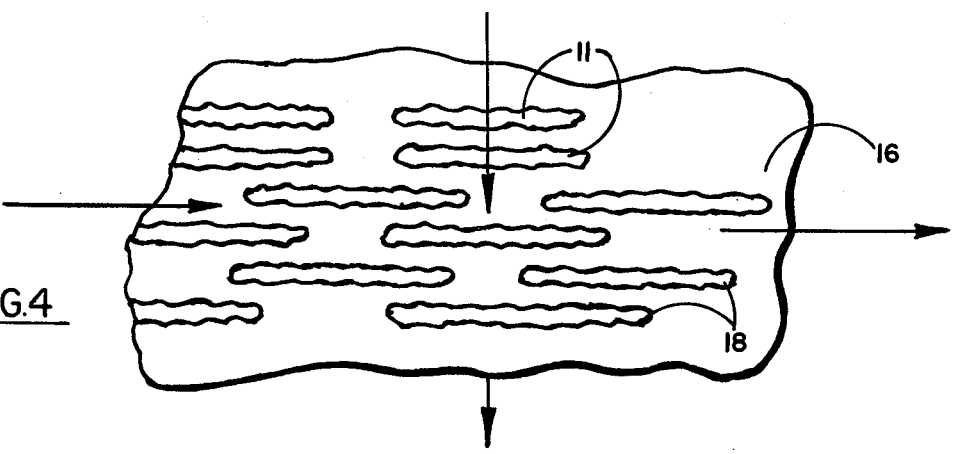
FIG. 4 is an enlarged view of a metal island formed on the surface of the transflector in accordance with the instant invention.

Referring to FIG. 4, there is shown an enlarged view of a portion of island 16 which includes the fissures 18 therein. As will be described hereinafter, it is noted that the islands which are superimposed on the wavy surface 14A exhibit the fissured pattern running in one direction across a substrate. Moreover, this fissured pattern has a wavelength which is approximately 1/10 that of the wave pattern of the substrate surface. It has been observed that the unidirectional fissured pattern increases the specular reflection for incident light having a component perpendicular to the direction of the fissure.

One method for producing such a transflector is to vapor deposit metal through a closely spaced mesh onto a smooth or calendared surface of plastic or the like (see FIG. 2). Another method is to vapor deposit the metal onto a rugose surface of vinyl (see FIG. 3). A contact print of the mesh holes results on the surface of the material. Of course, other deposition processes may be utilized.

Typically, the substrate is trimmed to size from a sheet of vinyl or suitable material. The substrates are cleaned on both sides using a soft nylon and several drops of Triton-100 or other suitable detergent. The substrate is then flooded with deionized (DI) water. The substrates are immediately blown dry with dry nitrogen and loaded into a conventional substrate holding rack.

Figure 5:
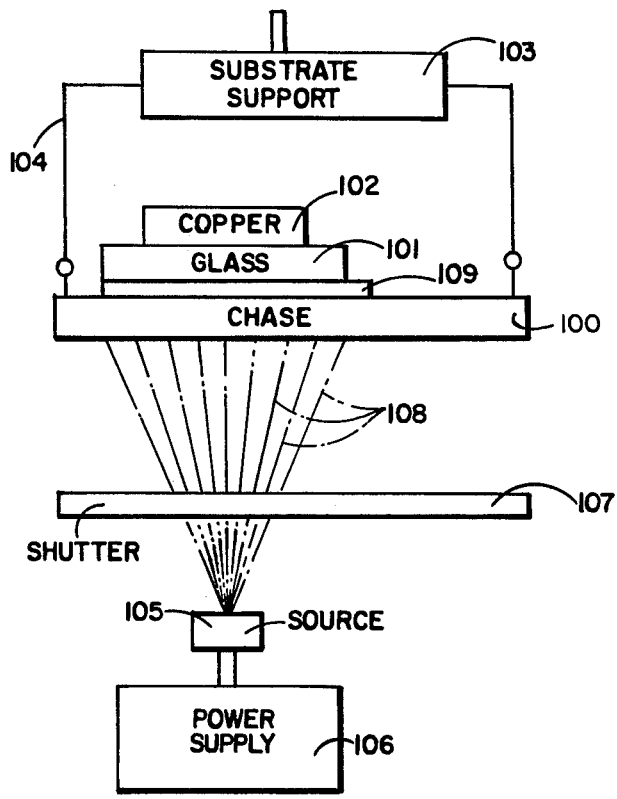
FIG. 5 is a schematic diagram of the apparatus for producing the transflector of the instant invention.

The processing is best shown schematically in FIG. 5. This apparatus is set up in a vacuum chamber (not shown). Screen chase 100 is spaced from source 105. In a preferred arrangement, chase 100 is about 14 from source 105. In the pertinent case, the chase is located such that the thickness monitor is not shielded from the source. Typically, chase 100 is suspended on wires 104 from support 103. A suitable clamp (not shown) may be attached at one side between the support and the chase in order to avoid vibration effects during deposition. Shutter 107 is provided for use during preheating of source 105 by power supply 106. Glass plate 101 and copper plate 102 are provided to maintain the substrates in position during the deposition process. Of course, any suitable processing apparatus may be utilized.

Figure 6:
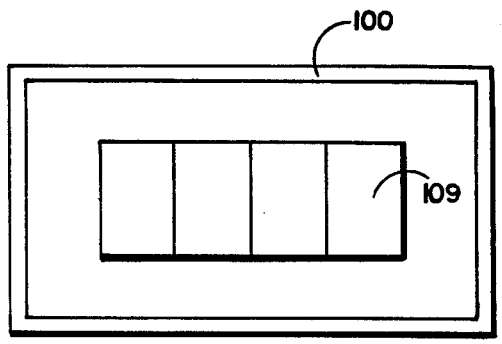
FIG. 6 and 7 show the transflectors arranged during the fabrication thereof.

As shown in FIG. 6, a plurality of pieces (e.g. four) of substrate material 109 are positioned on the screen chase. The four pieces butt against one another to minimize material loss through the screen. In the appropriate case, the rough (calendared) side of the substrate faces evaporation source 105. The flat glass backing plate 101 is placed over the substrates and then copper pressure block 102 is added over the glass backing plate.

Source 105 is loaded with the appropriate charge of aluminum or gold wire positioned in the center of the source (e.g. 400 mg. of gold pellets).

After a vacuum of $10^{-5}$ Torr is achieved and with shutter 107 shielding substrates 109 from source 105, power supply 106 is activated whereby power is applied to source 105 so that red heat is produced. Additional power is slowly applied to source 105 until the metal charge wets the source material. Shutter 107 is moved and additional power supplied to the source in order to provide an optically opaque coating within about 2 minutes.

After the appropriate thickness (i.e. optically opaque) is achieved, the source is allowed to cool for about 3 minutes. Then the vacuum chamber (not shown) is backfilled with dry nitrogen to atmospheric pressure.

Figure 7:
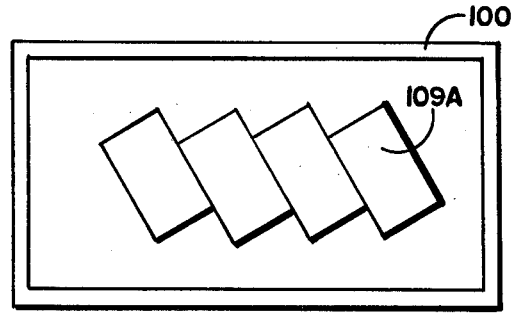

As shown in FIG. 7, the substrates 109A are rotated with respect to the screen chase and clamped once again with the glass-backing plate and copper pressure block. Source 105 is loaded with another charge of material and a second pump down and evaporation cycle is conducted similar to the first described above.

In one case, a single evaporation through an 81% transmission mesh was used. In another case, two successive depositions through a 65% open mesh wire was used. For the second deposition, the substrate was turned 45° with respect to the mesh pattern as described supra so as to minimize moire' patterns between the two depositions. This technique allowed the use of a relatively coarse mesh (100 pitch) but produced a pattern of 200 pitch as a result of the two exposures. If the substrate is turned other than 45°, an interference moire' pattern results which may be desirable in providing an esthetically pleasing pattern. Moreover, a different color reflecting film can be used for the second deposition to provide additional artistic latitude.

In the embodiment shown on FIG. 3, a directional reflection is obtained through use of a calendared vinyl substrate 14. Microscopically, the surface is similar to an ocean wave where the amplitude is at least 4% of the wavelength (± 15 microns) and the wavelength is between 200 and 600 microns. It should be noted that the calendared vinyl provides a surface with random variation of the wavelength and orientation within the limits described above. The result is a textured, semi-specular reflector with directionality.

Reflection values were measured by establishing a 100% reflection using a spot photometer view a diffuse image of Whatman filter paper at 90° to the plane of the paper. The paper was illuminated with white light at an angle of 20° with respect to a normal to the filter paper. A conventional non-transmitting matte aluminum foil LCD reflector measured 100%. A nine layer dielectric mirror measured 84%. The transflector of this invention measured 220%. A minimum value of 110% was measured for light striking the transflector with a major component parallel to the fissure direction. Thus, the textured half tone mirror provides an equal amount of reflection, in the normal viewing angle compared with a conventional LCD reflector while providing for back illumination as well.

It is believed that the transflector could be manufactured by photoetching procedures of a metalized film or by mechanically piercing holes in a metalized film and produce essentially the same effect.

Thus, there is shown and described a transflector which permits reflection of substantial percentages of incident light and transmission of substantial percentages of back light. This transflector lends itself to advantageous utilization in a wristwatch or similar application. The illustrated embodiments are not intended to be limitative of the invention.

Having thus described a preferred embodiment of the invention, what is claimed is:

1. A transflector comprising,
   a sheet of light transmitting material having an undulating surface, and
   a discontinuous film of light reflecting material on said surface of said sheet forming a plurality of islands which exhibit a fissured pattern running in one direction across said sheet, said film arranged to reflect substantial portions of incident light to prevent incident light from passing through said sheet and to permit light to be transmitted through said sheet from a light source behind said sheet.

2. The transflector recited in claim 1 wherein said islands are formed of metals and oxides of semiconductors, deposited on said surface of said sheet.

3. The transflector recited in claim 2 wherein said metal is a light reflective metal.

4. The transflector recited in claim 1 wherein said discontinuous film comprises discrete portions which are arranged at an angle relative to each other.

5. The transflector recited in claim 1 wherein said sheet comprises a transparent plastic material.

6. The transflector recited in claim 1 wherein said surface of said sheet has a wavelength of about 200 to 600 microns between crests of raised portions thereof and said crests have an amplitude of at least 4% of the wavelength.

7. The transflector recited in claim 1 wherein said surface exhibits a random variation in the wavelength, amplitude and orientation thereof.

8. The transflector recited in claim 1 wherein said sheet is fabricated of vinyl, and said surface of said sheet is calendared.

9. The transflector recited in claim 4 wherein, said discrete portions which are arranged at an angle relative to each other exhibit different colors.

* * * * *